United States Patent
Berger et al.

(10) Patent No.: US 10,890,644 B1
(45) Date of Patent: Jan. 12, 2021

(54) ANGLE-OF-ARRIVAL PROCESSING IN MULTI-ANTENNA MULTI-CHANNEL SHORT-RANGE WIRELESS SYSTEM

(71) Applicant: Marvell International Ltd., Hamilton (BM)

(72) Inventors: Christian R. Berger, San Jose, CA (US); Niranjan Grandhe, San Jose, CA (US); Sudhir Srinivasa, Campbell, CA (US)

(73) Assignee: Marvell Asia Pte, Ltd., Singapore (SG)

(*) Notice: Subject to any disclaimer, the term of this patent is extended or adjusted under 35 U.S.C. 154(b) by 321 days.

(21) Appl. No.: 16/046,108

(22) Filed: Jul. 26, 2018

Related U.S. Application Data

(60) Provisional application No. 62/561,964, filed on Sep. 22, 2017.

(51) Int. Cl.
*G01S 3/46* (2006.01)
*G01S 7/40* (2006.01)

(52) U.S. Cl.
CPC ............ *G01S 3/46* (2013.01); *G01S 7/40* (2013.01); *G01S 7/4021* (2013.01)

(58) Field of Classification Search
CPC .... G01S 7/40; G01S 7/4021; G01S 3/46–3/50
See application file for complete search history.

(56) References Cited

U.S. PATENT DOCUMENTS

| | | | | |
|---|---|---|---|---|
| 4,368,469 A * | 1/1983 | Ott | ............................ | G01S 3/46 342/352 |
| 4,638,321 A * | 1/1987 | Drogin | ...................... | G01S 3/50 342/417 |
| 4,876,549 A * | 10/1989 | Masheff | ..................... | G01S 3/46 342/417 |
| 5,608,410 A * | 3/1997 | Stilp | ...................... | H04W 64/00 342/387 |
| 9,048,980 B2 * | 6/2015 | Park | ..................... | H04W 56/006 |
| 2003/0103004 A1 * | 6/2003 | Arndt | ..................... | G01S 5/0205 342/465 |
| 2008/0284637 A1 * | 11/2008 | Blessing | ............... | G01S 13/933 342/30 |
| 2016/0187451 A1 * | 6/2016 | Meiman | .................... | G01S 3/48 342/442 |
| 2016/0242135 A1 * | 8/2016 | McLaughlin | ........ | H04B 1/7163 |
| 2016/0334498 A1 * | 11/2016 | Jamieson | .................. | G01S 5/04 |

(Continued)

*Primary Examiner* — Peter M Bythrow

(57) ABSTRACT

At a receiver in a short-range wireless system having a plurality of channels and a plurality of receiving antennas, an angle-of-arrival of a signal is determined by receiving, at at least two antennas, the signal on one of the channels, determining a phase difference between the signal as received at those antennas, removing a local oscillator phase from the phase difference to provide an adjusted phase difference, and determining, from the adjusted phase difference, the angle-of-arrival. Removing the local oscillator phase includes estimating a local oscillator phase for each channel to be used for all antennas, or determining an angle using multi-channel combining, and for each channel, using that angle to determine a channel local oscillator phase, or, for a given channel, identifying, as the local oscillator phase, a phase that minimizes the sum, over all antennas, of squares of phase differences between the given channel and a neighboring channel.

22 Claims, 6 Drawing Sheets

(56) References Cited

U.S. PATENT DOCUMENTS

2016/0345286 A1* 11/2016 Jamieson ................. G01S 3/023
2017/0085293 A1* 3/2017 Marrow .................... G01S 3/48
2017/0227623 A1* 8/2017 Park .................. H04W 56/0035

* cited by examiner

ANGLE-OF-ARRIVAL PROCESSING IN MULTI-ANTENNA MULTI-CHANNEL SHORT-RANGE WIRELESS SYSTEM

CROSS REFERENCE TO RELATED APPLICATION

This claims the benefit of copending, commonly-assigned U.S. Provisional Patent Application No. 62/561,964, filed Sep. 22, 2017, which is hereby incorporated by reference herein in its entirety.

FIELD OF USE

This disclosure relates to angle-of-arrival processing in a multi-antenna, multi-channel short-range wireless system (such as the system licensed by the Bluetooth Special Interest Group under the trademark BLUETOOTH®).

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Short-range wireless systems, such as the system licensed by the Bluetooth Special Interest Group under the trademark BLUETOOTH®, have traditionally been single-antenna systems. That is, each node in such a short-range wireless system, whether transmitting or receiving, used a single antenna. More recently, implementations of such a short-range wireless system using multiple antennas have been developed, leading to the ability for a receiving node to determine location of a transmitting node based, at least in part, on the angle of arrival.

The angle of arrival may be determined by measuring the phase difference between two signals from the same transmitting node received at different antennas. However, in a multipath environment, the received signal will be a superposition of many delayed and scaled copies arriving from different angles. The only definitive way to determine which of these multipath components is the line-of-sight component (which determines the angle of arrival) involves the joint processing of packets from multiple channels, to form a virtual wideband transmission and thereby estimate the multipath delays along with the angles. However, each packet (particularly because the packets are from multiple channels) will be affected by a different and unknown local oscillator phase, which affects the angle-of-arrival (AoA) determination.

SUMMARY

A method in accordance with implementations of the subject matter of the present disclosure, for determining, at a receiver in a short-range wireless system having a first plurality of channels and a second plurality of receiving antennas, an angle-of-arrival of a signal from a transmitter in the short-range wireless system, includes receiving, at at least two of the second plurality of receiving antennas, the signal on one of the first plurality of channels, determining a phase difference between the signal as received at each of the at least two of the second plurality of receiving antennas, removing a local oscillator phase value from the phase difference to provide an adjusted phase difference, and determining, from the adjusted phase difference, the angle-of-arrival of the signal.

In a first implementation of such a method, the removing the local oscillator phase value from the phase difference may include estimating a respective local oscillator phase value for each channel to be used for all antennas.

In a variant of that first implementation, the estimating the respective local oscillator phase value for each respective channel to be used for all antennas may include designating a respective local oscillator phase value for each respective channel at one antenna as the respective local oscillator phase value for each respective channel at all antennas.

In that variant of that first implementation, the designating the respective local oscillator phase value for each respective channel at one antenna as the respective local oscillator phase value for each respective channel at all antennas may include selecting, as the one antenna, an antenna, from among the second plurality of receiving antennas, at which a received signal is strongest.

In a second implementation of such a method, the removing the local oscillator phase value from the phase difference may include determining an angle using multi-channel combining, and for each channel, using the angle to determine a channel local oscillator phase value.

In a first variant of that second implementation, the determining the angle using multi-channel combining may include summing, over all channels, squares of a matched channel filter at each channel at respective candidate angles, and identifying a candidate angle at which a sum of the squares of the matched channel filter is a maximum.

In a second variant of that second implementation, the using the angle to determine the channel local oscillator phase value may include determining the phase of a channel-matched filter at the angle.

That second variant of that second implementation may further include providing an antenna array having a substantially orthogonal correlation function to minimize contributions from other angles.

In a third implementation of such a method, the removing the local oscillator phase value from the phase difference may include, for a given channel, identifying, as the local oscillator phase value, a phase angle that minimizes the sum, over all antennas, of squares of phase differences between the given channel and a neighboring channel.

In a first variant of that third implementation, the local oscillator phase value maybe separately determined for each channel by separately treating each channel as the given channel.

In a second variant of that third implementation, the local oscillator phase value is determined for the given channel in the first plurality of channels, and the second variant may further include determining a local oscillator phase difference between the given channel in the first plurality of channels and a neighboring channel in the first plurality of channels, and using the local oscillator phase value determined for the given channel, and the local oscillator phase difference, to determine local oscillator phase values for each other channel in the first plurality of channels.

In accordance with implementations of the subject matter of the present disclosure, a receiver in a short-range wireless system having a first plurality of channels includes a second plurality of receiving antennas, and control circuitry configured to receive, at at least two of the second plurality of receiving antennas, on one of the first plurality of channels, a signal from a transmitter in the short-range wireless system, determine a phase difference between the signal as received at each of the at least two of the second plurality of receiving antennas, remove a local oscillator phase value from the phase difference to provide an adjusted phase difference, and determine, from the adjusted phase difference, an angle-of-arrival of the signal from the transmitter in the short-range wireless system.

In a first implementation of such a receiver, the control circuitry may be configured to remove the local oscillator phase value from the phase difference by estimating a respective local oscillator phase value to be used for each respective channel at all antennas.

In a variant of that first implementation, the control circuitry may be configured to estimate the respective local oscillator phase value for each respective channel to be used for all antennas by designating a local oscillator phase value for each respective channel at one antenna as the respective local oscillator phase value for each respective channel at all antennas.

In that variant, the control circuitry is configured to designate a respective local oscillator phase value for each respective channel at one antenna as the respective local oscillator phase value by selecting, as the one antenna, an antenna, from among the second plurality of receiving antennas, at which a received signal is strongest.

In a second implementation of such a receiver, the control circuitry may be configured to remove the local oscillator phase value from the phase difference by determining an angle using multi-channel combining, and for each channel, using the angle to determine a channel local oscillator phase value.

In a first variant of that implementation, the control circuitry may be configured to determine an angle using multi-channel combining by summing, over all channels, squares of a matched channel filter at each channel at respective candidate angles, and identifying a candidate angle at which a sum of the squares of the matched channel filter is a maximum.

In a second variant of that implementation, the control circuitry may be configured to uses the angle to determine the channel local oscillator phase value comprises determining the phase of a channel-matched filter at the angle.

In that second variant, the control circuitry may be further configured to provide an antenna array having a substantially orthogonal correlation function to minimize contributions from other angles.

In a third implementation of such a receiver, the control circuitry may be configured to remove the local oscillator phase value from the phase difference by, for a given channel, identifying, as the local oscillator phase value, a phase angle that minimizes the sum, over all antennas, of squares of phase differences between the given channel and a neighboring channel.

In a first variant of that implementation, the control circuitry may be configured to separately determine the local oscillator phase value for each channel by separately treating each channel as the given channel.

In a second variant of that implementation, the control circuitry may be configured to determine the local oscillator phase value for the given channel in the first plurality of channels, determine a local oscillator phase difference between the given channel in the first plurality of channels and a neighboring channel in the first plurality of channels, and use the local oscillator phase value determined for the given channel, and the local oscillator phase difference, to determine local oscillator phase values for each other channel in the first plurality of channels.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As discussed above, short-range wireless systems, such as the system licensed by the Bluetooth Special Interest Group under the trademark BLUETOOTH®, have traditionally been single-antenna systems. That is, each node in such a short-range wireless system, whether transmitting or receiving, used a single antenna. More recently, implementations of such a short-range wireless system using multiple antennas have been developed.

In one application of a multi-antenna short-range wireless system, a receiving node can determine the location of a sending node by, in part, determining the angle of arrival of an incoming signal based on phase differences between signals from the same source as received at different antennas.

The angle of arrival may be determined by measuring the phase difference between two signals from the same transmitting node received at different antennas. However, as noted above, in a multipath environment, the received signal will be a superposition of many delayed and scaled copies arriving from different angles. The only definitive way to determine which of these multipath components is the line-of-sight component (which determines the angle of arrival) involves the joint processing of packets from multiple channels, to form a virtual wideband transmission and thereby estimate the multipath delays along with the angles. However, each packet (particularly because the packets are from multiple channels) will be affected by a different and unknown local oscillator phase, which affects the angle-of-arrival (AoA) determination.

Figure 1:
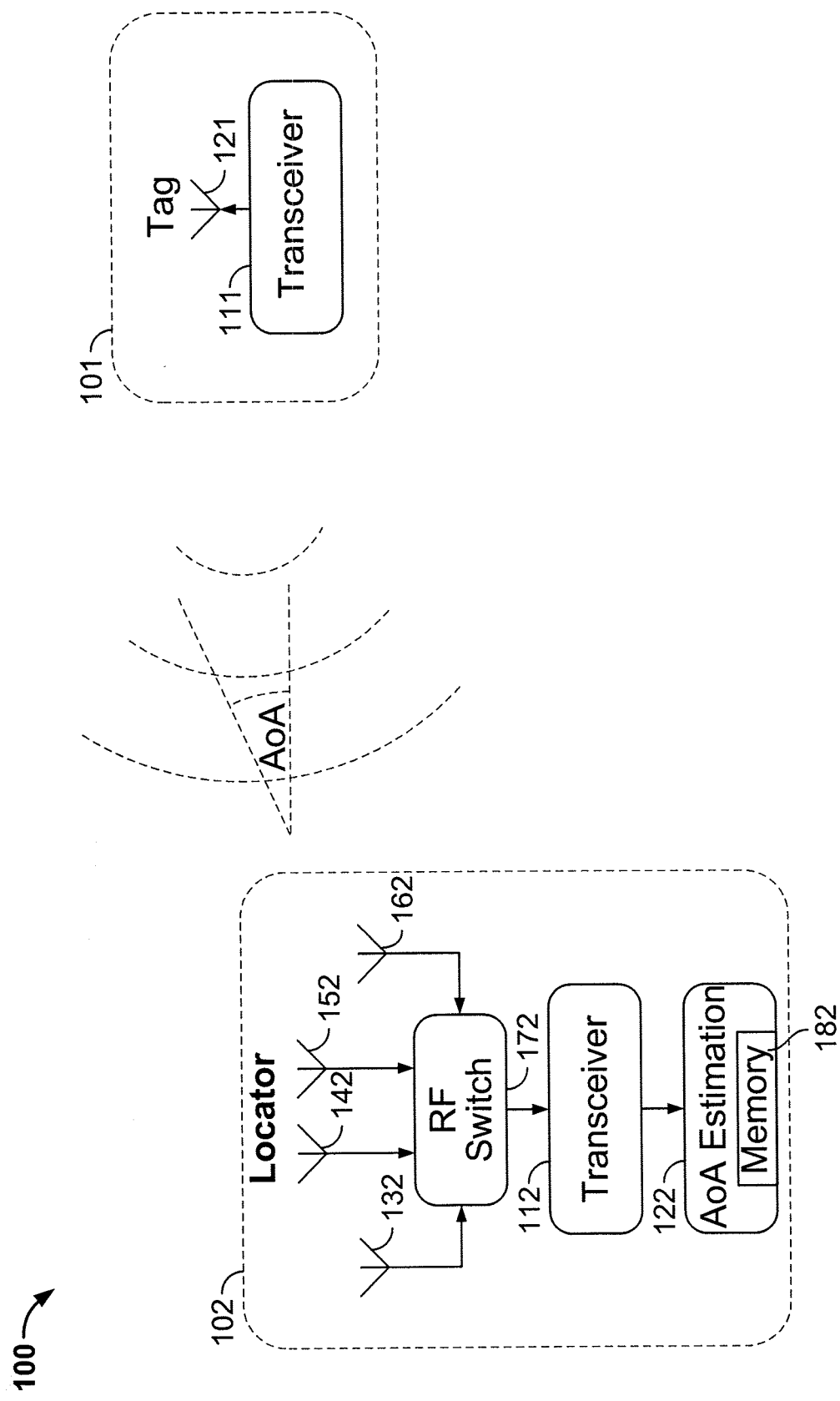
FIG. 1 shows an example of two nodes of a multi-antenna short-range wireless system in which implementations of the subject matter of this disclosure may be used.

An example of two nodes (e.g., network devices) of a multi-antenna short-range wireless system 100 is shown in FIG. 1. Node 101 is a single-antenna "tag," while node 102 is multi-antenna "locator" that can identify the direction to a tag, such as node 101, by determining the angle-of-arrival ("AoA") of a signal from node 101.

Node 101 includes a transceiver 111 and one antenna 121.

Node 102 includes a transceiver 112 and an AoA estimation engine 122, which may include memory 182, as well as a microprocessor, hard-wired circuitry, or configurable circuitry such as a field-programmable gate array, configured to perform the operations described below. Node 102 also includes four antennas 132, 142, 152, 162, and an RF switch 172 that couples antennas 132, 142, 152, 162 to transceiver 112. RF switch 172 switches from one of antennas 132, 142, 152, 162 to another in the range of a fraction of a microsecond to a small number of microseconds (e.g., up to about 4 µs). Although four antennas are illustrated in the drawings and described throughout the specification, the number of antennas can vary without deviating from the scope and spirit of the present disclosure.

For a path-length difference, x, from antenna 121 to two different ones of antennas 132, 142, 152, 162, the difference in the time-of-flight is $\Delta t = x/c$, where c is the speed of light. The phase difference $\Delta \varphi$ can then be derived as $\Delta \varphi = 2\pi (\Delta t/T) = 2\pi f \Delta t$, where T is the period $(1/f)$ of a signal of frequency f.

Figure 2:
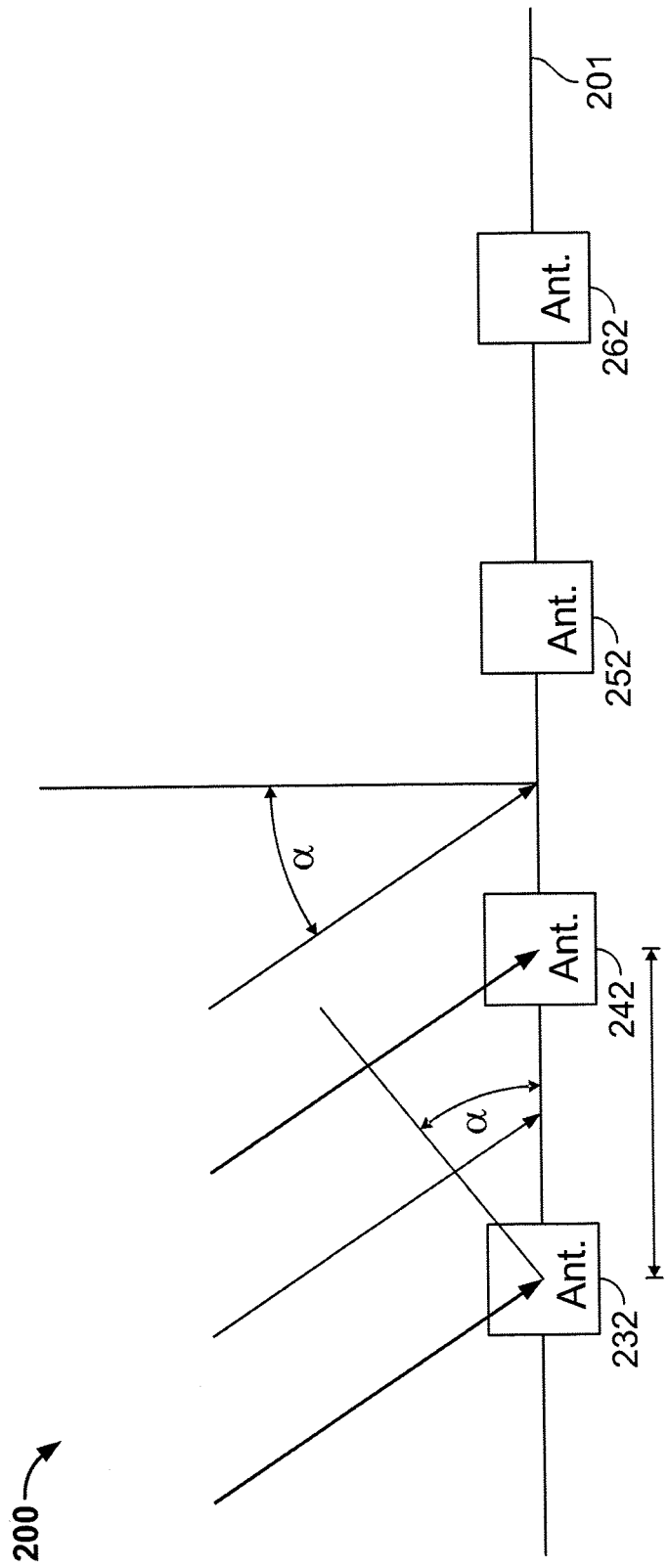
FIG. 2 shows portions of a multi-antenna short-range wireless system in which implementations of the subject matter of this disclosure may be used.

For ease of calculation, one can consider the system 200 of FIG. 2 where four antennas 232, 242, 252, 262 are arranged in a straight line 201 in a uniform linear array (ULA), and the tag to be located is far enough away that the paths traveled by the incoming signals arriving at each one of antennas 232, 242, 252, 262 can be considered to be parallel. If the AoA is $\alpha$, and the distance between each pair of adjacent ones of antennas 232, 242, 252, 262 is d, then the difference x in path length from antenna 121 to two adjacent ones of antennas 232, 242, 252, 262 is $x = d \sin \alpha$.

Substituting in the relationships set forth above:

$\Delta \varphi = 2\pi (\Delta t/T)$ or $2\pi f \Delta t$ $\Delta t = x/c$ $x = d \sin \alpha$ $\Delta \varphi = 2\pi (d \sin \alpha / Tc)$ or $2\pi f d \sin \alpha / c$ $\alpha = \arcsin(Tc\Delta\varphi/2\pi d)$ or $\arcsin(c\Delta\varphi/2\pi f d)$ T (or f) and d are known. Therefore, measuring $\Delta \varphi$ yields $\alpha$.

The foregoing determination assumes that the entire phase difference, $\Delta \varphi$, results from the different times-of-flight from the transmitting antenna to the different receiving antennas. However, as noted above, in a multipath environment, the received signal will be a superposition of many delayed and scaled copies arriving from different angles. The only definitive way to determine which of these multipath components is the line-of-sight component (which determines the angle of arrival) involves the joint processing of packets from multiple channels, to form a virtual wideband transmission and thereby estimate the multipath delays along with the angles. However, each packet (particularly because the packets are from multiple channels) will be affected by a different and unknown local oscillator phase, which affects the angle-of-arrival (AoA) determination.

The problem is compounded by the high likelihood that because of, e.g., reflections, any signal between two antennas travels on multiple different paths, arriving at the receiving antenna at different angles and slightly different times. This complicates angle-of-arrival determinations because (1) the same signal arrives at multiple different angles, and (2) the different path lengths traveled result in varying phase differences. The signal that is preferred for the angle-of-arrival determination is the line-of-sight signal that has not been reflected and therefore is in fact arriving at the angle that represents the direction from the receiving antenna to the transmitting antenna.

Figure 3:
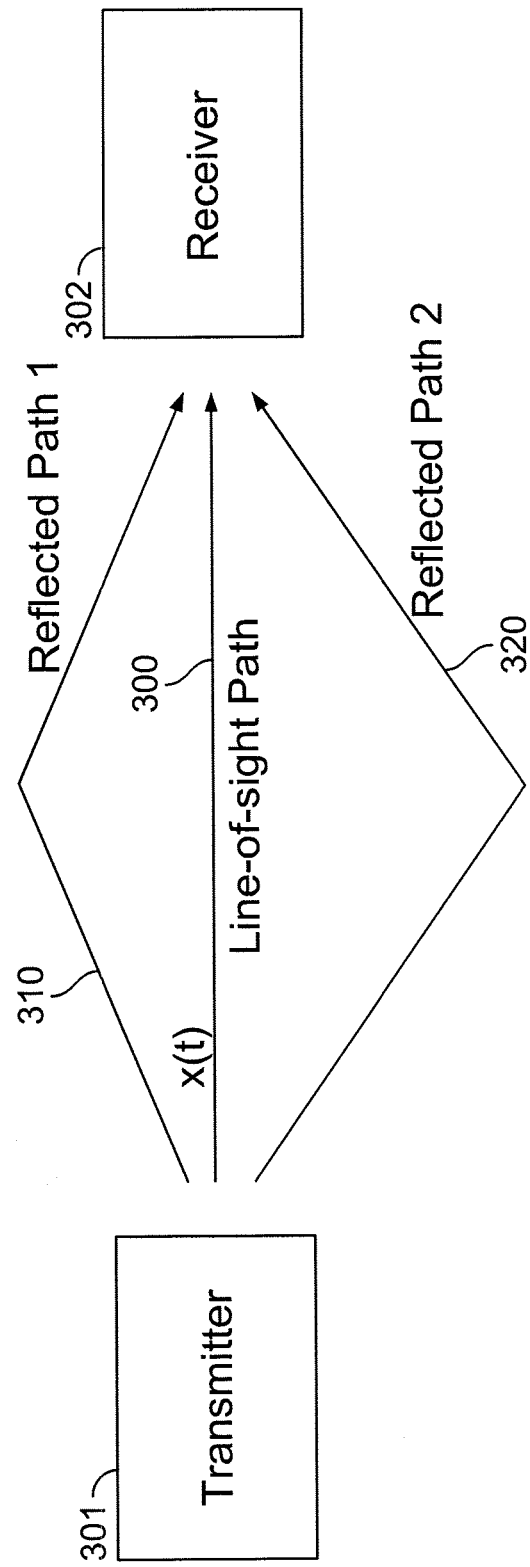
FIG. 3 is a diagram showing how a signal traveling between two nodes may follow multiple paths.

This is illustrated in FIG. 3, which shows a signal x(t) traveling along a line-of-sight path 300, as well as along two reflected paths 310 ("reflected path 1"), 320 ("reflected path 2"), between a transmitter 301 and a receiver 302. More generally, there can be any number of paths between transmitter 301 and receiver 302. If there is one line-of-sight path and N reflected paths, the received signal y(t) is the superposition of the signals on all N+1 of those paths p:

$$y(t) = A_0 e^{2\pi j f_c \tau_0} x(t-\tau_0) + A_1 e^{2\pi j f_c \tau_1} x(t-\tau_1) + A_2 e^{2\pi j f_c \tau_2} x(t-\tau_2) + \ldots + A_N e^{2\pi j f_c \tau_N} x(t-\tau_N) + w(t)$$

That is:

$$y(t) = \left( \sum_{p=0}^{N} A_p e^{2\pi j f_c \tau_p} x(t-\tau_p) \right) + w(t)$$

where:
- x(t) is the complex baseband representation of the transmitted signal, of bandwidth B
- $A_p$ is the scaling constant—i.e., the gain on the pth path,
- $\tau_p$ is the delay on the pth path,
- $f_c$ is the center frequency of channel c, and
- w(t) is the noise.

If $T \gg \tau_p$, which is true in the case of a BLUETOOTH® multi-antenna, multi-channel short-range wireless system, then for a sample taken at t=nT:

$$y(t) = \left( \sum_{p=0}^{N} A_p e^{2\pi j f_c \tau_p} x(nT-\tau_p) \right) + w(t) \approx \left( \sum_{p=0}^{N} A_p e^{2\pi j f_c \tau_p} \right) x(nT) + w(t)$$

This can be written:

$$y(n) = h(f_c) x(n) + w(n)$$

where $h(f_c)$ is the channel gain:

$$h(f_c) = \sum_{p=0}^{N} A_p e^{2\pi j f_c \tau_p}$$

With an array of k antennas, the channel seen at each antenna k is $$h(f_c, k) = \sum_{p=0}^{N} A_p e^{2\pi j f_c \tau_p + j \varphi_{p,k}}$$

The delays $\tau_p$, and the scaling constants $A_p$, are approximately the same for all k. The phase, $\varphi_{p,k}$, depends on the angle-of-arrival and the configuration of the antenna array, and can be split into a base phase and an array contribution to phase:

$$\varphi_{p,k} = \overline{\varphi}_p + \varphi_{Array}(\alpha_p, k)$$

For a uniform linear array with spacing d as described above:

$$\varphi_{ULA}(\alpha, k) = k\Delta\varphi(\alpha) = 2\pi k \frac{df_c \sin\alpha}{c}$$

For an N-element Uniform Circular Array (UCA) of diameter d:

$$\varphi_{UCA}(\alpha, k) = 2\pi \frac{df_c \cos(\alpha - 2\pi k/N)}{2c}$$

Substituting $\varphi_{p,k} = \overline{\varphi}_p + \varphi_{Array}(\alpha_p, k)$ in the channel gain expression above:

$$h(f_c, k) = \sum_{p=0}^{N} A_p e^{2\pi j f_c \tau_p + j\varphi_p + j\varphi_{Array}(\alpha_p, k)}$$

which can be written:

$$h(f_c, k) = \sum_{p=0}^{N} H_p(f_c) e^{j\varphi_{Array}(\alpha_p, k)}$$

where $H_p(f_c) = A_p e^{2\pi j f_c \tau_p + j\overline{\varphi}_p}$ are the complex path gains.

A matched filter can be constructed to correlate the channel with a candidate angle-of-arrival β:

$$\phi(\beta) = \sum_k e^{-j\varphi_{Array}(\beta, k)} h(k) = \sum_p H_p C_{Array}(\beta, \alpha_p)$$

where $C_{Array}(\beta, \alpha_p)$ is the antenna correlation function:

$$C_{Array}(\beta, \alpha_p) = \sum_k e^{j\varphi_{Array}(\alpha_p, k) - j\varphi_{Array}(\beta, k)}$$

The solution $\hat{\beta}$ is the angle at which $\phi(\beta)$ has its absolute, or global, maximum. However, in a multipath situation, there will be a local maximum for every $\beta = \alpha_p$, and it is not guaranteed that the line-of-sight path will have the largest magnitude channel gain, but the line-of-sight path will have the smallest path delay $\tau_p$.

A solution to the multipath problem is available in a multichannel environment, such as the BLUETOOTH® multi-antenna, multi-channel short-range wireless system. Assuming that the channels are spaced apart uniformly by Δf (as they are in a BLUETOOTH® multi-antenna, multi-channel short-range wireless system), and that each channel is measured by a separate packet, which has a random local oscillator phase $\theta_c$, the channel model is:

$$h(k, c) = \sum_{p=1}^{N} A_p e^{2\pi j(f_0 + c\Delta f)\tau_p + j\varphi_{Array}(\alpha_p, k) + j\theta_c}$$

The incoming angle of each path is captured in the relative phase change from antenna to antenna, and the associated path delay is captured in the phase change across channels, but that phase change across channels may be obscured by the local oscillator phase $\theta_c$.

One way to combine multiple channels is noncoherent multi-channel power combining:

$$M_{PC}(\beta) = \sum_c |\Phi_c(\beta)|^2$$

which helps suppress noise and averages and stabilizes the path magnitudes, $A_p$. However, the phase information across channels is lost by taking the squares of the magnitudes of the $\phi_c(\beta)$ values. Therefore, this type of combining cannot be used to solve the multi-path problem.

The direct line-of-sight path with the angle pointing to the actual transmitter will have the smallest delay $\tau_p$. But that information is contained in the phase information in the channel taps:

$$H_p = A_p e^{2\pi j f_c \tau_p + j\overline{\varphi}_p + j\theta_c}$$

To preserve the phase information, coherent multi-channel combining can be used.

If the local oscillator phase were constant across channels, such that $\theta_c = \theta_0$, the matched filter would correlate with the expected phases of both a candidate angle, β, and delay, ε:

$$\Phi(\beta, \varepsilon) = \sum_c \sum_k e^{-j\varphi_{Array}(\beta, k) - 2\pi jc\Delta f\varepsilon} h(k, c)$$
$$= \sum_p H_p C_{Array}(\beta, \alpha_p) C_{Delay}(\varepsilon, \tau_p)$$

where $$H_p = e^{2\pi j f_0 \tau_p + j\overline{\varphi}_p + j\theta_0}$$

$$C_{Delay}(\varepsilon, \tau_p) = \sum_c e^{2\pi jc\Delta f(\tau_p - \varepsilon)}$$

Each local peak in $|\phi(\beta, \varepsilon)|$ would correspond to one of the multiple paths. Therefore, one could process a coherent matched filter to return angle/delay pairs associated with a magnitude $|\phi(\hat{\beta}_n, \hat{\varepsilon}_n)|$, looking for all local peaks that are larger than a threshold γ:

$$|\phi(\hat{\beta}_n, \hat{\varepsilon}_n)| > \gamma$$

The candidate angle $\hat{\beta}_n$ that corresponds to the smallest delay $\hat{\varepsilon}_n$, meaning that that path arrived first, would represent the line-of-sight angle.

However, in a multi-antenna, multi-channel short-range wireless system (such as the BLUETOOTH® system), where each packet is transmitted on one channel, the local oscillator phase $\theta_c$ will change from packet to packet—i.e., when measuring each channel, the technique described in the previous paragraph would not work. Therefore, implementations of the subject matter of this disclosure compensate for the variation of the local oscillator phase across channel measurements.

The goal is to estimate jointly the angle-of-arrival and relative delay of each significant multi-path component. Once all angle/delay pairs are found, the angle with the smallest delay can be selected as the angle associated with the line-of-sight path. Although the local oscillator contribution to phase on each channel is different, there may be a predictable phase difference between different antennas on the same channel, correlating with the angle-of-arrival. Similarly, there may be a predictable phase difference between different channels on the same antenna, correlating with the delay. Implementations of the subject matter of this disclosure may take advantage of those correlations to remove or compensate for the unknown local oscillator contributions to phase.

Figure 4:
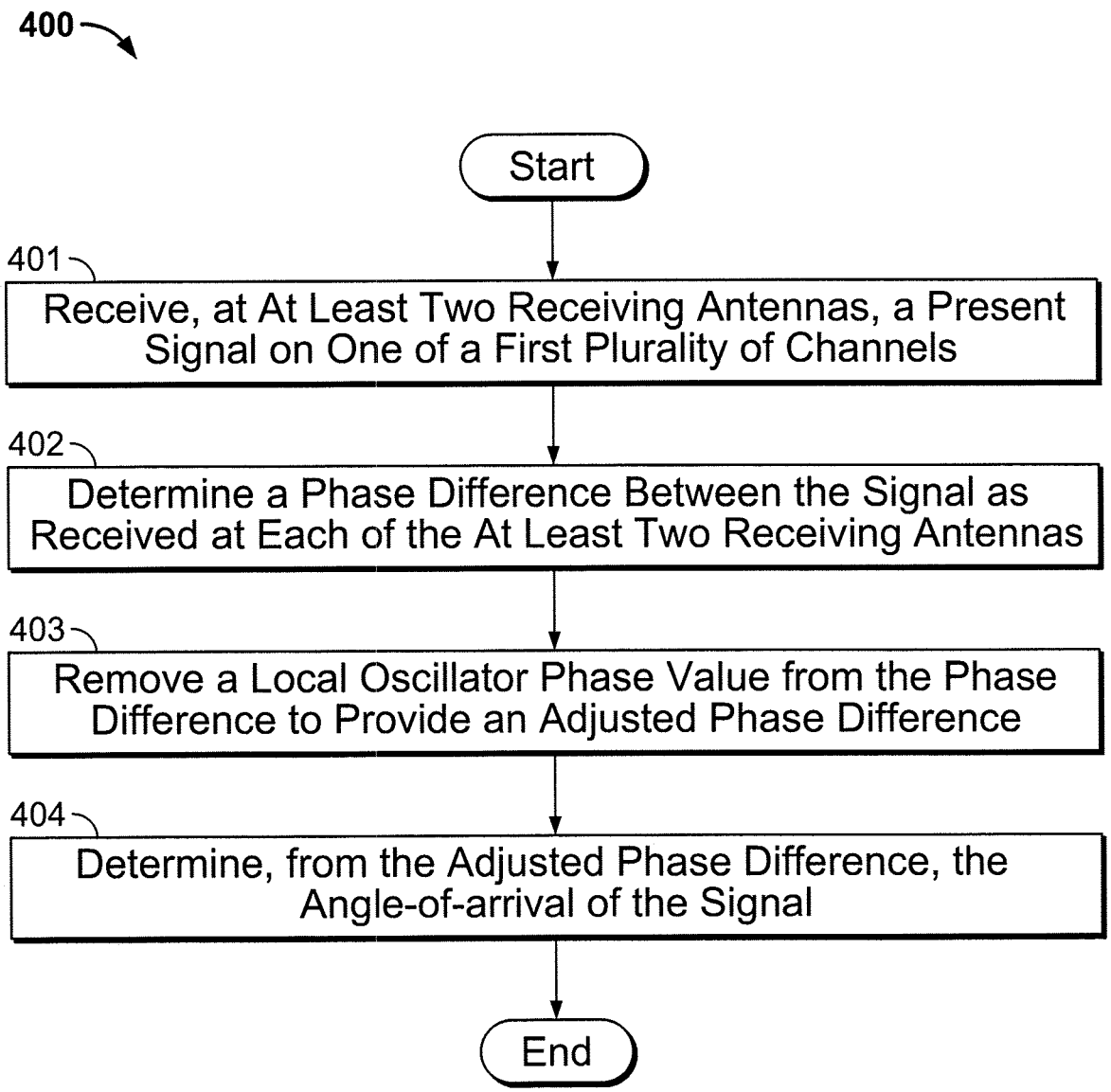
FIG. 4 is a flow diagram of the operation of implementations of the subject matter of this disclosure.

FIG. 4 illustrates a method 400 for determining an angle-of-arrival of a signal, according to one implementation of the subject matter of this disclosure. At 401, a network device receives a signal on one channel out of a first plurality of channels, at at least two receiving antennas. For example, node 102 receives a signal on at least two antennas of antennas 132, 142, 152, 162. At 402, a phase difference between the signal as received at each of the at least two receiving antennas is determined. At 403, a local oscillator phase value is removed from the phase difference to provide an adjusted phase difference. At 404, the angle-of-arrival of the signal is determined from the adjusted phase difference, and method 400 ends.

In an implementation of one technique 500 according to the subject matter of this disclosure for determining the angle-of-arrival at 404, one antenna in the array of k antennas (e.g., one antenna out of antennas 132, 142, 152, 162) is chosen as a reference antenna, and the phase on that antenna is determined for each channel and used for all antennas. For example, the first antenna can be chosen as the reference antenna, which assumes that one path is dominant. If the reference antenna is denoted k=0 and the dominant path is denoted p=0, it is assumed that $A_0 \gg A_p$ for all $p \neq 0$.

Under these assumptions, if the samples on channel c and antenna k are:

$$h(k, c) = \sum_{p=1}^{N} A_p e^{2\pi j(f_0 + c\Delta f)\tau_p + j\varphi_{Array}(\alpha_p, k) + j\theta_c}$$

and the assumed phase on channel c is:

$\hat{\theta}_c = \varphi(h(0,c)) \approx 2\pi(f_0 + c\Delta f)\tau_0 + \varphi_{Array}(\alpha_0, 0) + \theta_c$ then:

$$h_1(k, c) = h(k, c)e^{-j\hat{\theta}_c} \approx \sum_{p=1}^{N} A_p e^{2\pi j(f_0 + c\Delta f)(\tau_p - \tau_0) + j(\varphi_{Array}(\alpha_p, k) - \varphi_{Array}(\alpha_0, 0))}$$

Thus, the $\theta_c$ term is eliminated from the approximation of the signal, and $\alpha_p$, representing the angle-of-arrival, can be found as described above—e.g., using coherent multi-channel processing. The same way, other $\theta_c$ are found on all other channels. In other words, there is one local oscillator phase estimate per channel, which is applied to the data for that channel regardless of which antenna the data is received on. In this implementation, the phase on the reference antenna is chosen as the local oscillator phase.

Figure 5:
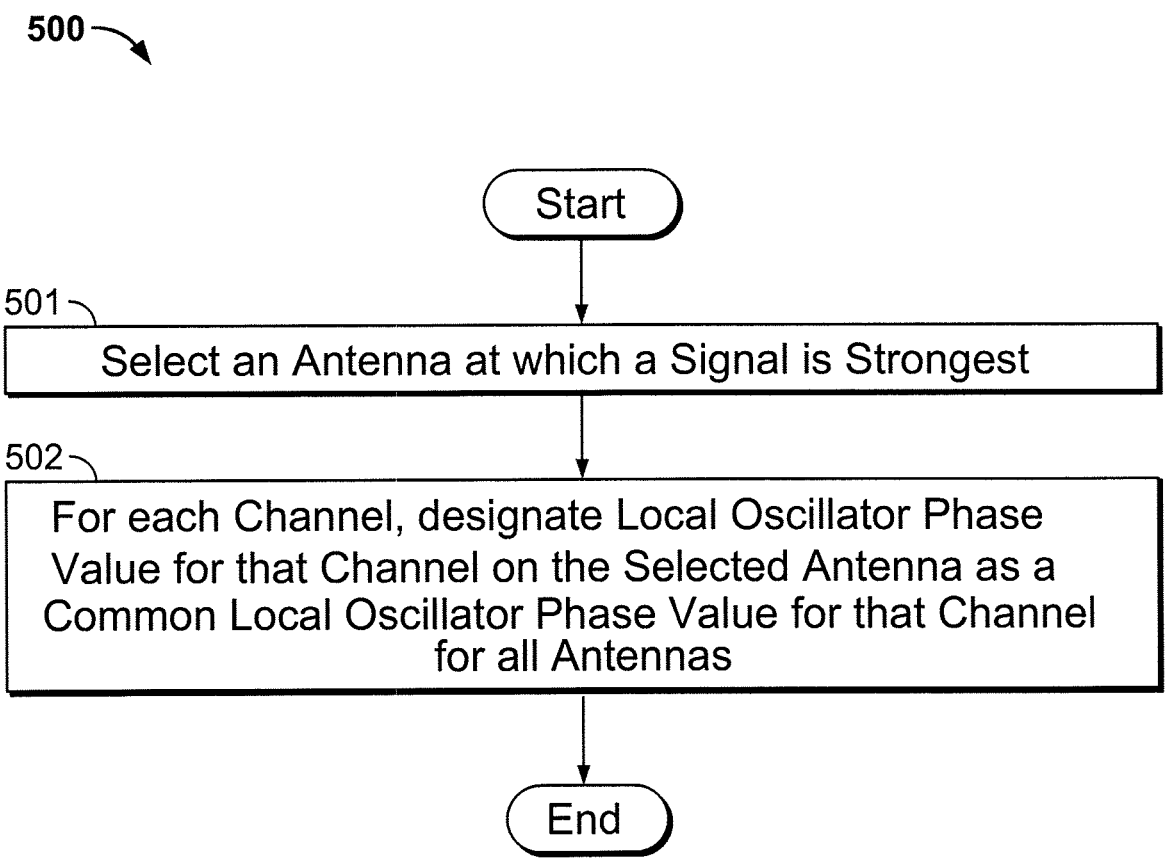
FIG. 5 is a flow diagram of a first technique for performing a portion of the operation diagrammed in FIG. 4.

Technique 500 is diagrammed in FIG. 5. At 501, an antenna at which a signal is strongest is selected. At 502, a respective local oscillator phase value for each channel at the selected antenna is designated as a respective local oscillator phase value for each channel at all antennas, and flow continues to 405.

The technique just described works well if one path is dominant ($A_0 \gg A_p$). According to another technique 600, even where there is no clearly dominant path, a channel matched filter can be used to suppress all paths but one. First, even though it loses phase information, noncoherent multi-channel combining may be used to find a candidate angle, which is the dominant one:

$$\tilde{\beta} = \max_{\beta} \sum_c |\Phi_c(\beta)|^2$$

The angle so identified can then be used to determine the local oscillator phase, $\theta_c$, on each channel:

$$\widetilde{\theta_c} = L(\Phi_c(\tilde{\beta})) = L\left(\sum_p A_p e^{2\pi j(f_0 + c\Delta f)\tau_p + j\varphi_p + j\theta_c} C_{Array}(\tilde{\beta}, \alpha_p)\right)$$

If the antenna correlation function, $C_{Array}(\beta, \alpha)$, is approximately orthogonal, then $C_{Array}(\beta, \alpha) \approx \delta(\beta - \alpha)$ That is, $C_{Array}(\beta, \alpha)$ equals approximately '1' when $\beta = \alpha$, and approximately '0' otherwise, minimizing or eliminating the contribution from other angles.

An estimate of the respective local oscillator phase can be found in this way for each respective channel, and that respective value can be removed (i.e., subtracted or factored out) for each respective channel, allowing $\alpha_p$ to be found as described above—e.g., using coherent multi-channel processing.

Figure 6:
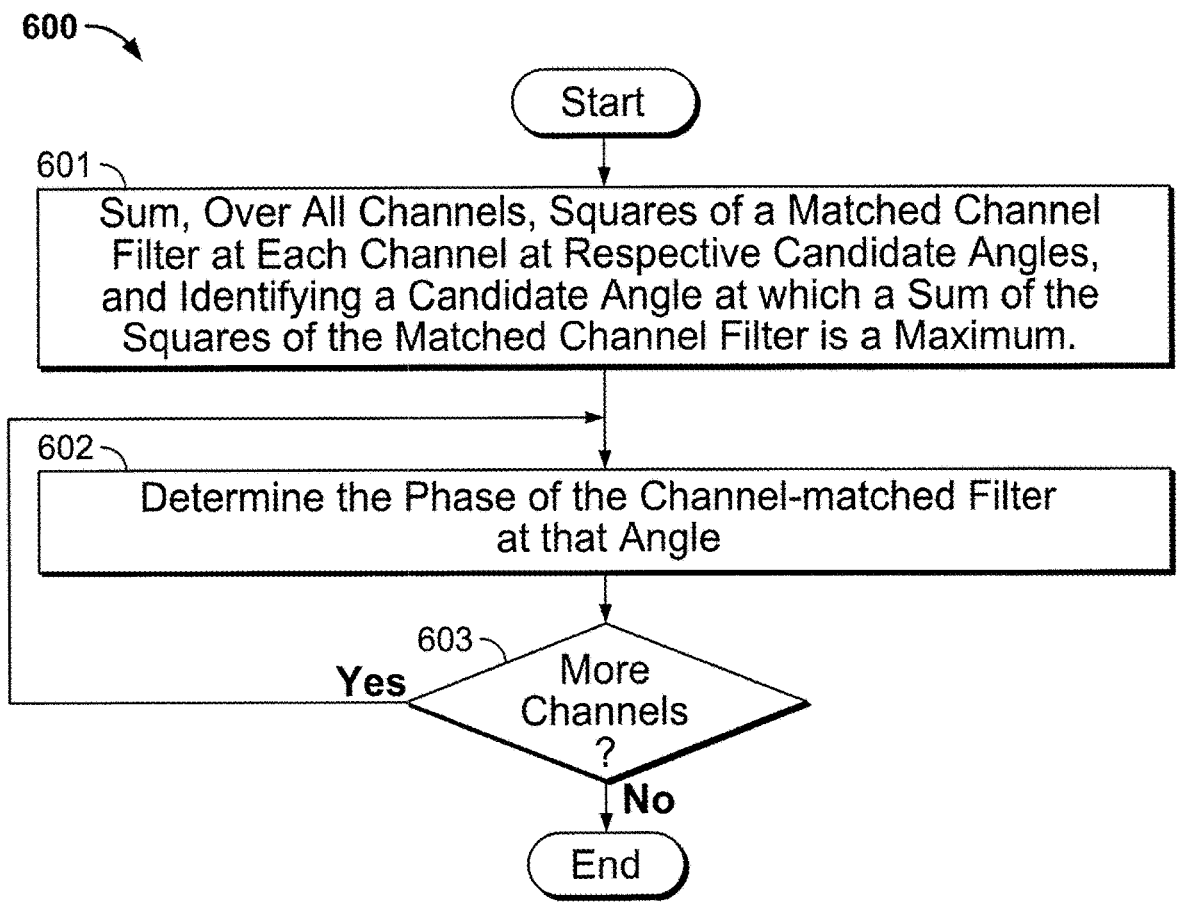
FIG. 6 is a flow diagram of a second technique for performing a portion of the operation diagrammed in FIG. 4.

Technique 600 is diagrammed in FIG. 6. At 601, squares of a channel-matched filter at each channel at respective candidate angles are summed over all channels, and a candidate angle at which a sum of the squares of the matched channel filter is a maximum is identified. At 602, the phase of the channel-matched filter at that angle is found for a channel, and used as the local oscillator phase for that channel. At 603, it is determined whether there are any additional channels for which the local oscillator phase is to be determined. If so, then flow returns to 602 to determine the phase of the channel-matched filter at that angle for the next channel. If at 603 there is no additional channel for which the local oscillator phase is to be determined, flow continues to 405.

A third technique 700 relies on the assumption that but for the random local oscillator phase, $\theta_c$, the phase across channels should change predictably, based on delays. In a BLUETOOTH® multi-antenna, multi-channel short-range wireless system, for example, where the channel spacing (1 MHz) is small relative to the inverse delay spread:

$$\Delta f \ll \frac{1}{|\tau_p - \tau_k|}$$

the phase change between neighboring channels not only depends on the delays, but also is limited in size. Therefore, one can find an estimate of the random local oscillator phase for each channel by finding a sampling angle $\vartheta$ at which the mean-squared phase difference across neighboring channels is minimized.

Adjacent channel pairs may be processed iteratively from lowest channel to highest channel, or from highest channel to lowest channel. From channel c to channel (c+1):

$$\widehat{\theta_c} = \min_{\vartheta} \sum_k |\angle(h(k,c)h^*(k,c+1)) - \vartheta|^2$$

where:

$$\angle(k,c)h^*(k,c+1)) \approx \Delta\theta_{k,c} + (\theta_c - \theta_{c+1})$$

represents the samples, and Δθ is an unknown random variable that changes from one channel/antenna pair to another. Because the summation is taken over all antennas, the result improves as the number of antennas, k, increases.

Once a respective value, $\widehat{\theta}_c$, is selected for the estimate of the local oscillator phase on each respective channel, that respective value can be removed (i.e., subtracted or factored out) for each respective channel, and $\alpha_p$ can be found as described above—e.g., using coherent multi-channel processing.

Figure 7:
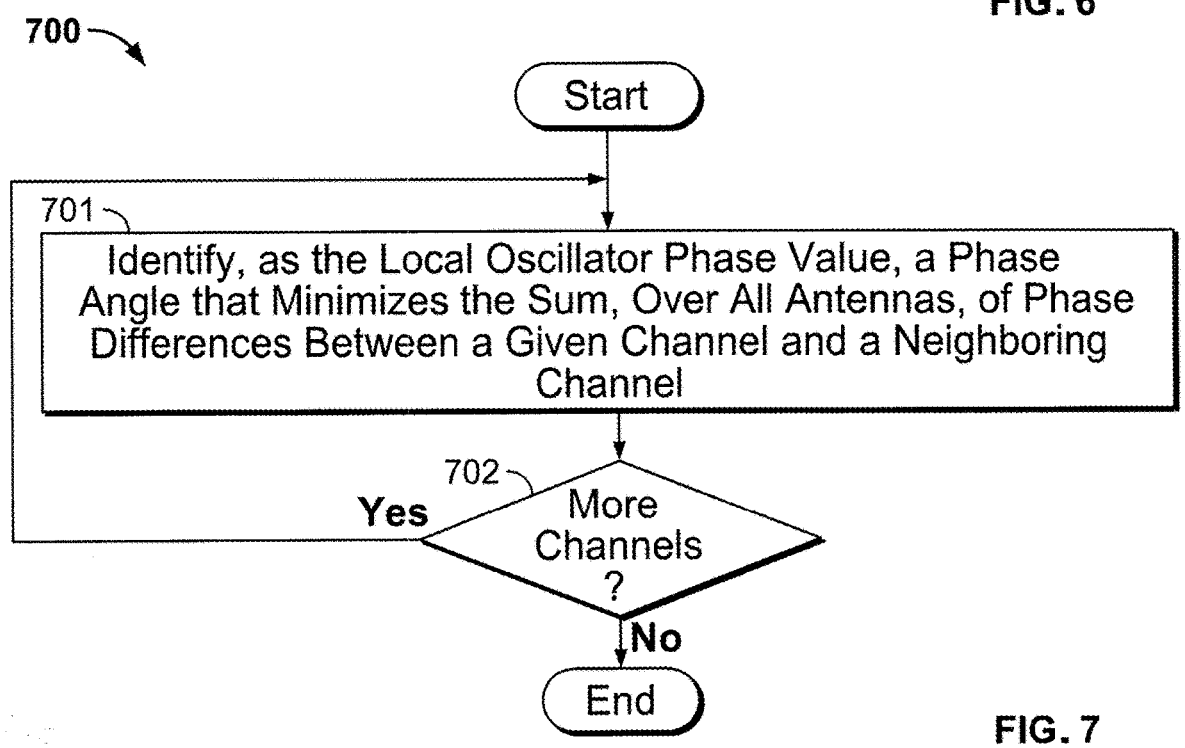
FIG. 7 is a flow diagram of a third technique for performing a portion of the operation diagrammed in FIG. 4.

Technique 700 is diagrammed in FIG. 7. At 701, a phase angle that minimizes the sum, over all antennas, of squares of phase differences between a given channel and a neighboring channel, is identified as the local oscillator phase value for a current channel. At 702, it is determined whether there are any additional channels for which the local oscillator phase is to be determined. If so, then flow returns to 701 to determine the phase of the channel-matched filter at that angle for the next channel. If at 702 there is no additional channel for which the local oscillator phase is to be determined, flow continues to 405.

As noted above, the operations described above for eliminating, or compensating for, the contribution of the local oscillator phase, and thereby improving AoA determinations, may be performed in AoA estimation engine 122, which may include memory 182, as well as a microprocessor, hard-wired circuitry, or configurable circuitry such as a field-programmable gate array (not explicitly shown), configured to perform the operations described.

Thus it is seen that methods and apparatus for eliminating, or compensating for, the contribution of the local oscillator phase in a multi-antenna, multi-channel short-range wireless system, which, among other things, improves angle-of-arrival determinations, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for determining, at a receiver in a short-range wireless system having a first plurality of channels and a second plurality of receiving antennas, an angle-of-arrival of a signal from a transmitter in the short-range wireless system, the method comprising:
    receiving, at at least two of the second plurality of receiving antennas, the signal on one of the first plurality of channels;
    determining a phase difference between the signal as received at each of the at least two of the second plurality of receiving antennas;
    removing a local oscillator phase value from the phase difference to provide an adjusted phase difference, including determining an angle using signals from multiple channels; and
    determining, from the adjusted phase difference, the angle-of-arrival of the signal.

2. The method of claim 1 wherein the removing the local oscillator phase value from the phase difference comprises estimating a respective local oscillator phase value for each channel to be used for all antennas.

3. The method of claim 2 wherein the estimating the respective local oscillator phase value for each respective channel to be used for all antennas comprises designating a respective local oscillator phase value for each respective channel at one antenna as the respective local oscillator phase value for each respective channel at all antennas.

4. The method of claim 3 wherein the designating the respective local oscillator phase value for each respective channel at one antenna as the respective local oscillator phase value for each respective channel at all antennas comprises:
    selecting, as the one antenna, an antenna, from among the second plurality of receiving antennas, at which a received signal is strongest.

5. The method of claim 1 wherein the removing the local oscillator phase value from the phase difference comprises:
    determining the angle using multi-channel combining; and
    for each channel, using the angle to determine a channel local oscillator phase value.

6. The method of claim 5 wherein the determining the angle using multi-channel combining comprises:
    summing, over all channels, squares of a matched channel filter at each channel at respective candidate angles; and
    identifying as the angle a candidate angle at which a sum of the squares of the matched channel filter is a maximum.

7. The method of claim 5 wherein the using the identified angle to determine the channel local oscillator phase value comprises determining the phase of a channel-matched filter at the identified angle.

8. The method of claim 7 further comprising providing an antenna array having a substantially orthogonal correlation function to minimize contributions from other angles.

9. The method of claim 1 wherein the removing the local oscillator phase value from the phase difference comprises, for a given channel, identifying, as the local oscillator phase value, a phase angle that minimizes the sum, over all antennas, of squares of phase differences between the given channel and a neighboring channel.

10. The method of claim 9 wherein the local oscillator phase value is separately determined for each channel by separately treating each channel as the given channel.

11. The method of claim 9 wherein:
    the local oscillator phase value is determined for the given channel in the first plurality of channels; the method further comprising:
    determining a local oscillator phase difference between the given channel in the first plurality of channels and a neighboring channel in the first plurality of channels; and
    using the local oscillator phase value determined for the given channel, and the local oscillator phase difference, to determine local oscillator phase values for each other channel in the first plurality of channels.

12. A receiver in a short-range wireless system having a first plurality of channels, the receiver comprising:
a second plurality of receiving antennas; and
control circuitry configured to:
receive, at at least two of the second plurality of receiving antennas, on one of the first plurality of channels, a signal from a transmitter in the short-range wireless system;
determine a phase difference between the signal as received at each of the at least two of the second plurality of receiving antennas;
remove a local oscillator phase value from the phase difference to provide an adjusted phase difference, including determining an angle using signals from multiple channels; and
determine, from the adjusted phase difference, an angle-of-arrival of the signal from the transmitter in the short-range wireless system.

13. The receiver of claim 12 wherein the control circuitry is configured to remove the local oscillator phase value from the phase difference by estimating a respective local oscillator phase value to be used for each respective channel at all antennas.

14. The receiver of claim 13 wherein the control circuitry is configured to estimate the respective local oscillator phase value for each respective channel to be used for all antennas by designating a local oscillator phase value for each respective channel at one antenna as the respective local oscillator phase value for each respective channel at all antennas.

15. The receiver of claim 14 wherein the control circuitry is configured to designate a respective local oscillator phase value for each respective channel at one antenna as the respective local oscillator phase value by:
selecting, as the one antenna, an antenna, from among the second plurality of receiving antennas, at which a received signal is strongest.

16. The receiver of claim 12 wherein the control circuitry is configured to remove the local oscillator phase value from the phase difference by:
determining the angle using multi-channel combining; and
for each channel, using the angle to determine a channel local oscillator phase value.

17. The receiver of claim 16 wherein the control circuitry is configured to determine the angle using multi-channel combining by:
summing, over all channels, squares of a matched channel filter at each channel at respective candidate angles; and
identifying a candidate angle at which a sum of the squares of the matched channel filter is a maximum.

18. The receiver of claim 16 wherein the control circuitry is configured to use the identified angle to determine the channel local oscillator phase value by determining the phase of a channel-matched filter at the identified angle.

19. The receiver of claim 18 wherein the control circuitry is further configured to provide an antenna array having a substantially orthogonal correlation function to minimize contributions from other angles.

20. The receiver of claim 12 wherein the control circuitry is configured to remove the local oscillator phase value from the phase difference by, for a given channel, identifying, as the local oscillator phase value, a phase angle that minimizes the sum, over all antennas, of squares of phase differences between the given channel and a neighboring channel.

21. The receiver of claim 20 wherein the control circuitry is configured to separately determine the local oscillator phase value for each channel by separately treating each channel as the given channel.

22. The receiver of claim 20 wherein the control circuitry is configured to:
determine the local oscillator phase value for the given channel in the first plurality of channels;
determine a local oscillator phase difference between the given channel in the first plurality of channels and a neighboring channel in the first plurality of channels; and
use the local oscillator phase value determined for the given channel, and the local oscillator phase difference, to determine local oscillator phase values for each other channel in the first plurality of channels.

\* \* \* \* \*